United States Patent Office 2,772,816
Patented Dec. 4, 1956

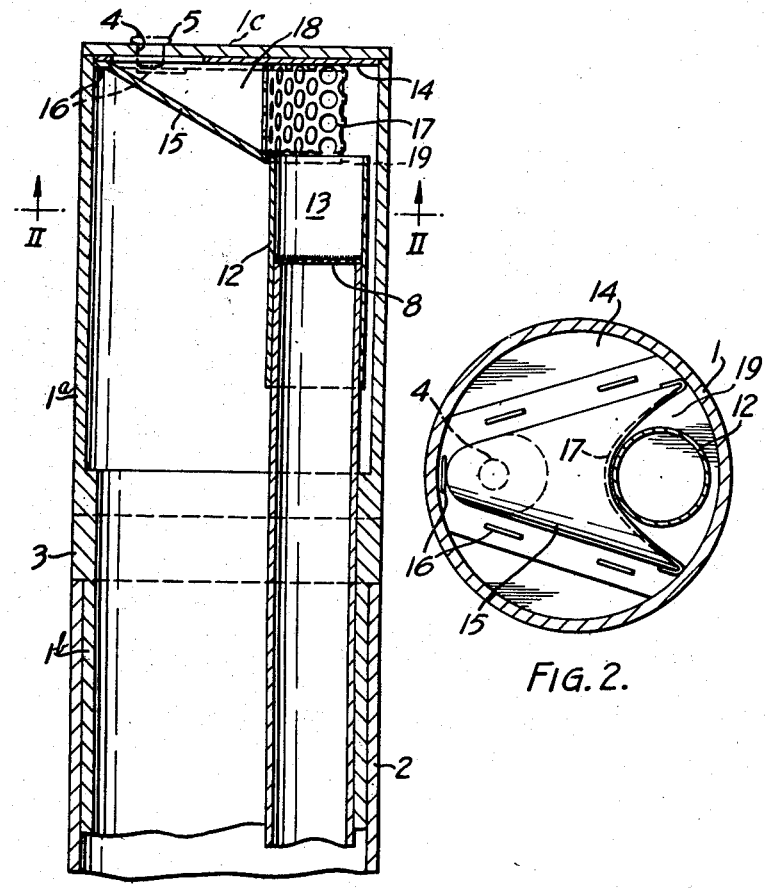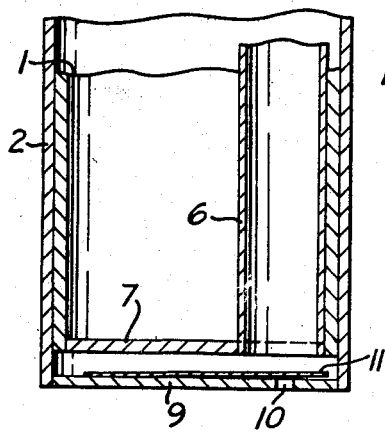

2,772,816

SPRAYING DEVICES FOR POWDER

George Denvor, St. Mary's Terrace, London, England

Application March 8, 1954, Serial No. 414,829

Claims priority, application Great Britain March 12, 1953

13 Claims. (Cl. 222—189)

This invention relates to spraying devices for powder or solid substances of small granular mesh, which substances hereinafter will be referred to generally as powder, the device being adapted to act as an air pump to eject and spray or diffuse the powder.

One object of the invention is to provide an expendible hand-operated sprayer, in which substantially the whole of the interior thereof can be utilised to contain the powder to be sprayed, and to ensure an ample, even, uniform controlled and powerful jet or spray of powder through the spraying orifice, in all positions in which the device may be held, thus catering for upward, horizontal or downward spraying.

A powder spraying device, according to the present invention, includes inner and outer telescopically mounted cylinders, adapted to form a reciprocatory air pump, the inner cylinder forming a powder container, an air tube passing through the inner cylinder to terminate in a position near the top of the powder container, and a one-way valve in association with, that is to say within or on top of the air tube, to define, between the valve and the top of the air tube, a powder reservoir, the arrangement being such that, for downward or horizontal spraying, the air tube delivers a stream of air through the powder in the area between the top of the air tube and the top of the inner cylinder, to carry powder to a spraying orifice, whilst, for upward spraying, the powder in the reservoir is carried to the spraying orifice.

The spraying orifice may be in axial alignment with the air-tube, which may be positioned close to the wall of the powder container, but preferably is positioned diametrically opposite said air tube. In the latter case, the delivery end of said air tube leads into a shield which may be semi-conical in shape and extends over the powder spraying orifice and is adapted to form a small receiving or collecting chamber for powder, which is blown out of the chamber through the spraying orifice by the air from the tube.

The shield is so formed as to leave a space or inlet for powder so that only a limited quantity of powder is trapped therein; a filter may be provided within the shield to minimize blockage due to lump formation in the powder mass.

The chamber collects only sufficient powder for each horizontal or downwardly spraying operation, the powder and air being guided by the shield to the spraying orifice, so that efficient and powerful spraying is possible.

The shield may be carried by a disc secured to the top end of the powder container and have an opening therein larger than the spraying orifice in the said top end, but partly in register with said spraying orifice. When the one-way valve is mounted on top of the air tube, a sleeve may be telescopically mounted on the delivery end of the air tube, to provide, with the valve, the powder reservoir, the capacity of which can be varied by relative movement between the sleeve and tube; preferably the one-way valve is secured on the top of the air tube and defines the bottom of the powder reservoir.

Said valve preferably takes the form of a disc of fibrous material having a smooth surface on the underside and a hairy surface on the top, e. g. swansdown cloth; with such a swansdown cloth valve, air can pass freely through from the lower to the top, whilst air attempting to pass in reverse direction presses the hairs down to provide a powder seal.

Due to the provision of the air tube, it will be apparent that air, drawn into the device by the pumping operation, is compressed into a relatively small area defined by the diameter of the air tube and issues therefrom as a powerful stream which either passes directly to the spraying orifice, when this is in axial alignment with the air tube, or is directed to said orifice by the shield.

One form of spraying device according to this invention is illustrated in the accompanying drawing, in which Figure 1 is a vertical section and Figure 2 a plan view of the inside of the top of the device on the line II—II Figure 1.

Referring to the drawing, the spraying device includes a cylinder unit indicated as a whole by the numeral 1 and comprising an upper cylinder 1a and lower cylinder 1b over the latter of which is slidable an outer cylinder 2. The cylinder 1b is shown in the present instance as being formed with a projecting ring 3 forming a stop to limit upward movement of the cylinder 2 on the cylinder 1b. The cylinder 1a may fit tightly around the portion of the cylinder 1b projecting above the ring 3 while the cylinder 2 is freely slidable on the cylinder 1b. The specific structure of the cylinder unit 1 may be of any practicable form. For example, the ring 3 may be eliminated and the lower end of the cylinder 1a may be extended downwardly and serve as a stop to limit inward movement of the cylinder 2. The cylinder 1a is closed at the top as at 1c and is formed with a spraying orifice 4 which, when the device is not in use, may be closed by a rubber or like plug 5 shown in broken lines in Figure 1.

An air tube 6 is fixed in an opening in the bottom end 7 of the inner cylinder 1a, which forms the powder container, and extends upwardly through said cylinder adjacent the wall thereof. The air tube 6 is open at the bottom and at the top carries a one-way valve 8 in the form of a cap of swansdown cloth, as defined above. It will be appreciated that the air tube 6 is open to the free passage of air from outside the inner cylinder 1a.

The outer cylinder 2 has a perforated closure 9 at its bottom end, an aperture being shown at 10, for the entry of air from the atmosphere, and is also provided at that end with a flap valve 11, which may be made of thin material such as paper, so that, on outward relative movement between the two cylinders 1, 2, the aperture or apertures 10 is or are uncovered by the flap valve 11 to allow air to enter the outer cylinder and, on inward relative movement between the two cylinders, said aperture or apertures is or are closed.

Slidably mounted on the top of the air tube 6 is a sleeve 12, which, when projecting above the top end of the air tube, forms, a powder reservoir 13, the base of which is provided by the one-way valve 8.

Secured to the top closure 1c, preferably through the intermediary of a disc 14, is a shield 15, the securing being performed by any convenient means, for example by staples 16, as shown more particularly in Figure 2. Within the entrance to the shield is a filter 17.

The space between the top of the sleeve 12 and the spraying orifice 4 forms a powder collecting chamber 18; the top of the sleeve 12 may, when slidden over the air tube 6, even extend into the said chamber near the larger part thereof remote from the spraying orifice 4.

It will be apparent that a gap 19 is provided at the larger end of the chamber 18, close to the side of the cylinder 1, so that, when the device is rotated or dipped, a small quantity of powder from the bulk in the container cylinder can pass through the gap into the chamber.

The cylinder unit 1 forms a container for the powdered material to be sprayed and it will be apparent that the powder can escape from the chamber within the cylinder unit 1 only through the gap 19 into the upper chamber 18. The air tube 6 is imperforate, and being closed at its upper end by the valve 8, it will be apparent that no powder ever finds its way into the air tube.

The spraying device, as illustrated, can readily be utilised for spraying powder either in a downward direction, in a horizontal direction, or in an upward or vertically upward direction. Spraying is effected by withdrawing the plug 5 from the spraying orifice 4, and by movement of the outer cylinder 2 with respect to the inner cylinder 1.

The device may be inclined downwardly towards the location to be sprayed, care then being taken to see that the spraying orifice 4 is at the top of closure 1c. In these conditions, powder from the inner cylinder 1 spills into the space 18 above the top of the sleeve 12, i. e., the powder collecting chamber 19.

On relative reciprocation between the outer and inner cylinders, air is drawn into the outer cylinder 2 on the outward stroke and is forced into the air tube 6 on the inward stroke. By this operation, a stream of air is forced through the air tube 6, through the one-way valve 8 to carry powder thereabove, through the filter 17 in the shield 15, to the spraying orifice 4, so that the powder is sprayed or diffused therethrough, the shield 15 acting as a guide for the air and powder entrained therein to the spraying orifice.

It will be appreciated that, with the spraying device held horizontally, the same action will be obtained, provided the device first be dipped to allow powder to fall into the space 18 above the sleeve 12.

When, however, it is desired to spray in an upward direction or even vertically upwards, the device is first of all dipped downwards so that powder fills the space 18 above the sleeve 12 and, when the device is then brought into an upward direction, powder enters the powder reservoir 13 and, on relative movement of the inner and outer cylinders, the powder in the reservoir is forced by the air stream into the funnel 15 through the filter 17, and again into the spraying orifice. Due to the positioning of the air tube 6 and its sleeve 12, powder can be scooped into the powder reservoir 13 when the device is tilted downwards, thus enabling the reservoir to be filled for upward spraying. Particular attention is invited to the fact that the orifice 4 is offset from the axis of the air tube 6. More specifically, the orifice 4 preferably is arranged relative to the axis of the cylinder unit 1 diametrically opposite the air tube 6. Less advantageous results would be obtained if the orifice 4 were in alinement with the axis of the tube 6 since the air pumped through the orifice 4 would be far less effective in picking up and blowing the powder through the orifice. With the arrangement shown, the air stream is far more effectively utilized in blowing powder through the orifice 4, a substantially denser spray thus being provided.

When spraying downwards, it will be appreciated that the quantity of powder which can be carried out by the air stream can be increased or reduced by increasing or reducing the space between the delivery end of the air tube 6 and the end of the powder cylinder 1 by sliding movement of the sleeve 12 on the air tube 6.

In whatever position the device may be held, the bulk of powder in the container cylinder is held away from the spray orifice by the shield 15 and filter 17, so that compression of powder and clogging of the orifice are avoided. Undue waste of powder is prevented, as any powder that can escape, when the device is held downwardly, is limited to that which happens to be left in the small chamber, if the plug 5 is not in position.

The device may be made of any convenient material but, preferably, the cylinders, air tube and shield are made of cardboard.

I claim:

1. A powder spraying device comprising an inner cylinder forming a powder container, an outer cylinder slidably mounted on said inner cylinder, an outlet in the bottom of said outer cylinder and a one-way valve in conjunction with said outlet, whereby the cylinders together form a reciprocatory air pump, an air-tube passing through the inner cylinder, positioned close to the wall of the inner cylinder, to terminate in a position near the top of the powder container, and a one-way valve in association with the top of the air-tube, to define between the said valve and the top of the air tube a powder reservoir, the arrangement being such that, for downward or horizontal spraying, the air tube delivers a stream of air, through the powder in the area between the top of the air tube and the top of the inner cylinder, to carry powder to a spraying orifice, whilst, for upward spraying, the powder in the reservoir is carried to the spraying orifice.

2. A device as claimed in claim 1 in which a sleeve is telescopically mounted on the delivery end of the air tube, in which case the one-way valve is positioned at the open end of the air tube, the telescopic sleeve being provided for varying the capacity of the powder reservoir.

3. A device as claimed in claim 1 in which the one-way valve on top of the air tube consists of a sheet of fibrous material, such as swansdown cloth, said valve defining the bottom of the powder reservoir.

4. A device as claimed on claim 1 in which a shield is positioned around the powder spraying orifice, into which shield the air tube leads, said shield forming a small powder receiving chamber, which powder can be blown out of said chamber through the spraying orifice by the air from the air tube.

5. A powder spraying device comprising an elongated hollow body having a cap at one end provided with an outlet orifice and having a closure at its other end, said body having a shield therein defining with said cap an outlet chamber, said body being adapted to contain a powder to be sprayed, an air tube within said body open at its ends and having one end communicating with said outlet chamber and having its other end communicating through said closure at said other end of said body, a check valve in said air tube opening toward said outlet chamber, a pump body slidable on said other end of said hollow body and corresponding in cross sectional shape thereto, said pump body having a closure at the end thereof adjacent the closure of said hollow body provided with an air inlet opening, and an inwardly opening check valve controlling said inlet opening whereby outward movement of said pump body admits air thereinto and inward movement of said pump body forces air from said pump body through said air tube to be discharged through said first-named check valve into said discharge chamber for flow through said orifice, said shield having portions in spaced relation to said hollow body for the flow therefrom of powder into said outlet chamber.

6. A device as claimed in claim 5 wherein said discharge orifice is substantially offset laterally of said hollow body from said air tube.

7. A device as claimed in claim 5 wherein said discharge orifice is substantially offset laterally of said hollow body from said air tube, said shield being inclined toward said cap whereby said discharge chamber decreases in cross sectional area from said air tube to said discharge orifice.

8. A device as claimed in claim 5 wherein said discharge orifice is substantially offset laterally of said hollow body from said air tube, said shield being inclined toward said cap whereby said discharge chamber decreases in cross sectional area from said air tube to said discharge orifice, and a filter arranged between said air tube and said discharge orifice in said discharge chamber.

9. A powder spraying device comprising a container cylinder having a cap on one end and a closure at the other end, said cap being provided with a discharge orifice, a shield extending across the interior of said container cylinder and dividing the latter to form a discharge chamber adjacent said discharge orifice and a container chamber between said shield and said closure, an imperforate air tube one end of which extends through said closure and the other end of which opens into said discharge chamber, a check valve in said air tube opening toward said discharge chamber, a pump cylinder slidable over said container cylinder at the end thereof opposite said discharge chamber, said pump cylinder having a head outwardly of the closure of said container cylinder provided with an inlet opening, and an inwardly opening flap valve carried by the head of said pump cylinder to admit air into said pump cylinder whereby, upon outward movement of said pump cylinder, air will flow thereinto and upon inward movement of said pump cylinder air will be forced from said pump cylinder through said air tube to flow past said check valve into said discharge chamber and through said discharge orifice, said shield having a portion spaced from said container cylinder for the admission of powder into said discharge chamber.

10. A device as claimed in claim 9 wherein said discharge orifice is diametrically opposite said air tube with respect to the axis of said container cylinder.

11. A device as claimed in claim 9 wherein said discharge orifice is diametrically opposite said air tube with respect to the axis of said container cylinder, and wherein said shield slopes from said air tube toward said cap whereby said discharge chamber decreases in cross sectional area toward said discharge orifice.

12. A device as claimed in claim 9 wherein said discharge orifice is diametrically opposite said air tube with respect to the axis of said container cylinder, and wherein a filter is arranged in said discharge chamber between said air tube and said discharge orifice and extends between said shield and said cap.

13. A device as claimed in claim 9 wherein said discharge orifice is diametrically opposite said air tube with respect to the axis of said container cylinder, and wherein a filter is arranged in said discharge chamber between said air tube and said discharge orifice and extends between said shield and said cap, said shield being inclined from said air tube toward said orifice whereby the cross sectional area of said discharge chamber decreases toward said discharge orifice.

References Cited in the file of this patent

UNITED STATES PATENTS

| | | |
|---|---|---|
| 1,715,986 | Brown | June 4, 1929 |
| 1,841,646 | Slocum | Jan. 19, 1932 |
| 2,071,580 | Rose | Feb. 23, 1937 |
| 2,315,581 | Berenson | Apr. 6, 1943 |
| 2,525,742 | Weiss et al. | Oct. 10, 1950 |
| 2,580,580 | Nicolle | Jan. 1, 1952 |